STEAM HEATING SYSTEM

Original Filed Nov. 25, 1952 2 Sheets-Sheet 1

INVENTORS.
Joseph T. Reader
BY Robert P. Butler
Harness, Dickey & Pierce
ATTORNEYS.

STEAM HEATING SYSTEM

Original Filed Nov. 25, 1952 2 Sheets-Sheet 2

INVENTORS.
Joseph T. Reader.
Robert P. Butler.
BY
Harness, Dickey & Pierce
ATTORNEYS.

United States Patent Office

Re. 24,513
Reissued Aug. 12, 1958

24,513

STEAM HEATING SYSTEM

Joseph T. Reader, Grosse Ile, and Robert P. Butler, Birmingham, Mich.

Original No. 2,788,177, dated April 9, 1957, Serial No. 322,372, November 25, 1952. Application for reissue December 10, 1957, Serial No. 701,950

18 Claims. (Cl. 237—9)

Figures 1, 2, 3:
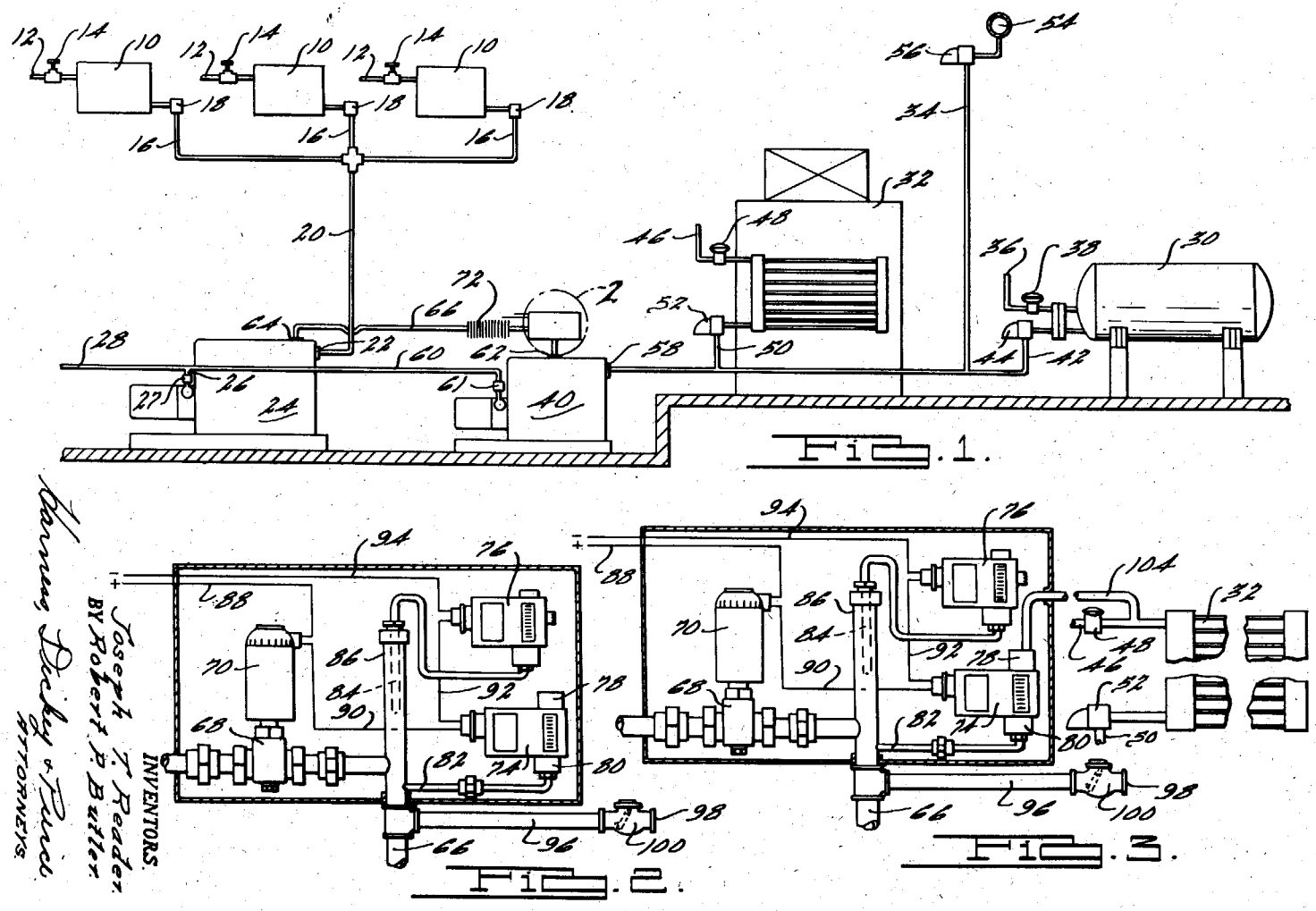

Matter enclosed in heavy brackets [ ] appears in the original patent but forms no part of this reissue specification; matter printed in italics indicates the additions made by reissue.

This invention relates to steam heating systems and to apparatus adapted for use in such systems.

This application is a continuation, in part, of our copending application Serial No. 124,146, filed October 28, 1949, and now abandoned.

In many installations and particularly in large buildings, steam heating equipment is divided into two main systems; i. e., a direct heating system which supplies the radiators and like apparatus and an indirect heating system which supplies central fan units, hot water heaters, steam tables, coffee urns, and the like. According to conventional practice, steam is supplied to both systems from a common boiler, and the condensate returns from both systems are conventionally returned to the same boiler. Because [or] *of* relatively low pressure in the steam supply line of the direct heating system, it usually is necessary to put a vacuum pump in the return line thereof in order to maintain proper circulation of steam through radiators and to assure efficient operation of the system. The indirect heating system, on the other hand, conventionally may be equipped only with a condensate pump which moves condensate in the return line of the system back to the boiler but does not create a vacuum in the return line.

Many conditions, however, arise in normal operation where the above arrangement is inefficient or even inoperative. For example, whenever the inlet of any piece of apparatus in the system is equipped with a throttling valve, the valve may close down so that insufficeint steam is admitted to replace steam removed by condensation. Under these conditions a partial vacuum is created in the apparatus which holds the condensate suspended in the apparatus. As a result, the efficiency of the apparatus is materially reduced, and this is particularly true in the case of heating equipment. Further, if this condition exists throughout the entire system, sufficient condensate may accumulate in the various pieces of apparatus to exhaust the boiler. If this occurs the boiler runs dry, becomes overheated, and may buckle, rupture, or even explode when water is returned to it. Another difficulty attending the above circumstance is that conditions in the system may change so that all the condensate in the various pieces of apparatus is released at once. The condensate pump in the return line, although adequate under normal conditions, may be unable to handle the condensate, and, as a result, water spews out the pump and the area in the vicinity of the pump is flooded.

In order to overcome the above difficulties the return lines of the direct and indirect heating systems are sometimes joined to form a single return line which includes a vacuum heating pump capable of handling condensate and also of maintaining a reduced pressure in the lines. In this manner the return lines are kept relatively free of air and noncondensable gases, and any tendency for the condensate to hang in the various pieces of apparatus is obviated.

However, the above expedient has not proved entirely satisfactory. The return condensate from the direct heating system is usually considerably cooler than the condensate from the indirect heating system, since the former handles a smaller quantity of steam, the heating units are located at widely scattered points throughout the building, and the return lines usually are sufficiently longer so that considerable heat is dissipated through the pipes. In a typical installation the return condensate in the direct heating system may be about 140° F., whereas the return condensate in the indirect heating system may be 200° F. The combined condensate may reach the pump at about 180° F. The above temperatures are representative only and in some instances they may be considerably higher. The high temperature of the condensate often makes it difficult, if not impossible, for the vacuum heating pump in the return line of the system to maintain the required vacuum due to a tendency of the condensate to flash into steam in or near the pump. When this happens, the pump runs continuously, causing excessive wear and power consumption. Even more serious is the fact that under these conditions the pump, despite continuous operation, is unable to maintain a sufficiently reduced pressure in the return lines of the systems to assure efficient operation of apparatus in the systems. The ill effects of this condition are particularly pronounced in the direct heating system. There, relatively lower pressures must be maintained in return lines, since steam is conventionally supplied to this system at a relatively low pressure. For example, steam may be supplied to the direct heating system under about two pounds per square inch pressure and to the indirect heating system at about five pounds per square inch pressure. Failure to maintain adequate vacuum in the return lines of the direct heating system results in cold radiators throughout the building or simply a failure of the individual radiator units to heat properly.

It is not practical to overcome the condition last referred to above by merely installing a pump of relatively larger capacity. This expedient materially increases installation and maintenance costs and in many instances this increase is so excessive that it cannot be justified. Moreover, the capacity of the pump required to maintain the necessary vacuum in the return lines of the systems in any particular instance varies considerably, depending upon the temperature of the return condensate and this temperature varies greatly, depending on a large number of variable factors. The temperature of the condensate may be highest when the weather outside is coldest, so that the system tends to break down under conditions where it is most desperately needed.

An important object of the present invention is to provide a steam heating system that maintains the reduced pressures necessary for efficient operation in the return lines of both the direct and the indirect heating systems.

Another object of the invention is to provide steam heating apparatus wherein reduced pressure is maintained in the return lines of both the direct and indirect systems by a vacuum pump of relatively small capacity so as to maintain installation and maintenance costs at a minimum.

Still another object of the invention is to provide steam heating apparatus wherein the returning condensate from the direct and indirect heating systems is handled so as to prevent the relatively hotter returns in the indirect system from decreasing the capacity and efficiency of the vacuum producer.

Yet another object of the invention is to provide a steam heating system wherein the benefits of a controlled vacuum can be applied to the returns of all low-pressure heating apparatus regardless of the temperature of the various returns.

A further object of the invention is to provide a steam heating system wherein the return side of the system is uniquely constructed so that the necessary vacuum is maintained in the returns of the direct heating system at all times and in the returns of the indirect heating system only when a vacuum is beneficial.

Other objects and advantages of the invention will be apparent during the course of the following description.

Figure 4:
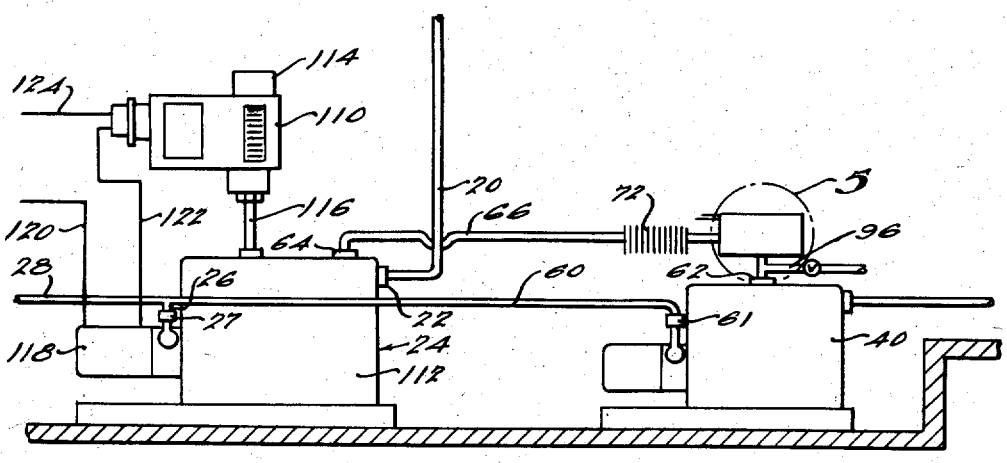
Figure 5:
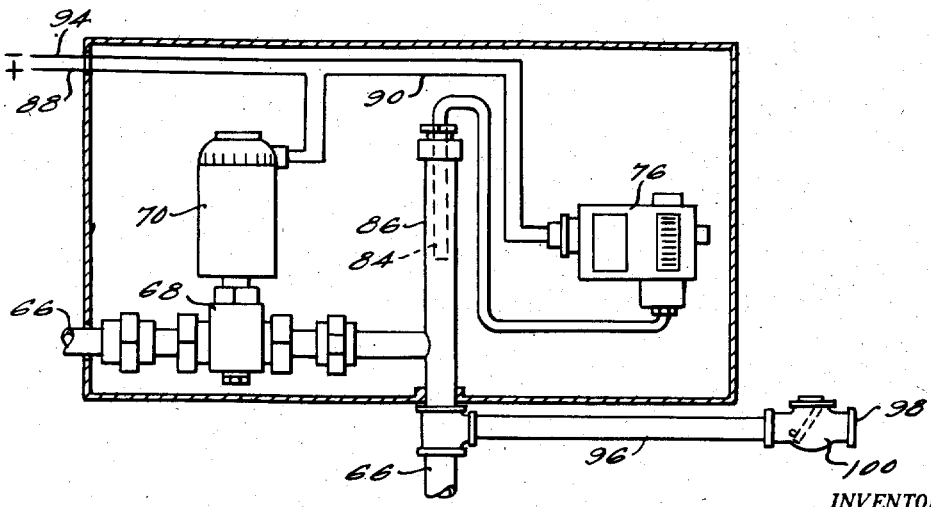

In the drawings forming a part of this specification and wherein like numerals are employed to designate like parts throughout the same, Fig. 1 is a diagrammatic view showing a steam heating system embodying the invention, Fig. 2 is an enlarged view showing the portion of Fig. enclosed in the circle, Fig. 3 is a view similar to Fig. 1 but showing a modified arrangement embodying the invention, Fig. 4 is a diagrammatic view showing a modified steam heating system embodying the invention, and Fig. 5 is an enlarged view showing the portion of Fig. 4 enclosed in the circle 5.

Attention is first directed to Fig. 1 which shows a typical steam heating installation having a direct heating system and an indirect heating system and wherein the returns from the two systems are correlated and controlled according to the present invention. It is to be understood that steam is supplied to the systems under requisite pressures according to conventional practice.

The direct heating system here shown comprises a series of radiators 10. Steam from any suitable source, such as a boiler or the like, is supplied to each radiator 10 through a pipe 12 controlled by the usual valve 14. As suggested, steam conventionally is supplied to the radiators 10 at about two pounds per square inch pressure. Condensate is discharged from the radiators 10 through pipes 16 controlled by the usual traps 18, and the pipes 16 are connected to a common return line 20 which leads to the inlet 22 of a vacuum heating pump 24. The latter is adapted to handle liquid returned through the pipe 20 and also to maintain a reduced pressure or partial vacuum in the return lines of the system. As suggested, the water in the return line 20 at or adjacent the pump 24 rarely exceeds 140° F., inasmuch as the direct heating system is composed of many small units scattered throughout the building and has a long, extensive system of steam and return piping. Thus a vacuum heating pump 24 will maintain a desired vacuum of twenty inches of mercury, for example, required in the return lines of this system. Further, the low temperature of the returns obviates the possibility of the condensate flashing into steam in the pump at the reduced pressure normally maintained therein. Condensate is discharged from the pump 24 through pipes 26 and 28 which carry the same back to the boiler. Pipes 26 and 28 are controlled by the usual valves 27 and 61 respectively which prevent backflow to the pumps 24 and 40.

The indirect heating system here shown comprises a hot water heater 30, a central fan unit 32, and a main drip line 34. All of this equipment is conventional. Steam is supplied to the heating coils of the heater 30 through a pipe 36 controlled by the usual valve 38, and condensate from the coils is discharged to a condensate pump 40 through a pipe 42 controlled by the usual trap 44. Similarly, steam is supplied to the heating coil of the central fan unit 32 through a pipe 46 controlled by a valve 48, and condensate from the heating coil is discharged to the main return line 42 through a pipe 50 controlled by the usual trap 52. The hot drip line 34 carries condensate which forms in the main supply line 54 back to the main return line 42, and the pipe 34 is controlled by a trap 56 in the conventional manner. The main return line 42 is connected to the inlet 58 of the condensate pump 40, and condensate from the pump is discharged through a pipe 60 which connects to the main boiler-return line 28. As suggested, steam is conventionally supplied to the indirect heating system at a pressure of about five pounds per square inch and the return condensate may be from 180° F. to 200° F. or even higher. The condensate pump 40 merely handles liquid. It is not a vacuum producer.

According to the present invention the vacuum heating pump 24 is utilized to maintain a relatively low vacuum in the return side of the indirect heating system, but the pump is connected into the indirect heating system in such a way that it does not handle any of the hot returns from the system. Thus the relatively low-capacity vacuum heating pump 24 is able to maintain a relatively high vacuum in the return lines of the direct heating system and a relatively low vacuum in the return lines of the indirect heating system when conditions in that system are such that a vacuum is necessary or desirable, and this is accomplished in such a way that condensate handled by the pump 24 will not flash into steam under vacuum conditions in the pump.

More specifically, the air vent 62 of the condensate pump 40 is connected to the inlet 64 of the vacuum heatinf pump 24 by a pipe 66, and the pipe is controlled by a normally closed valve 68 (Fig. 2). Any type of automatic valve 68 is satisfactory. Typical examples are solenoid-operated valves, motorized valves, and mechanically operated valves. A solenoid-operated valve is here shown, and the solenoid portion of the valve is designated by the numeral 70. Thus, vapors and noncondensable gases in the condensate pump 40 are drawn into the vacuum heating pump 24 when valve 68 is open, and the vacuum heating pump 24 simultaneously draws a vacuum on the return side of the indirect heating system. If necessary or desirable, the pipe 66 may be equipped with cooling fins 72 to maintain air and gases traversing the pipe as cool as possible.

In order to maintain a proper vacuum in the return lines of the indirect heating system when such vacuum is required, a vacuum controller 74 and a high-temperature control 76 are connected in series in the electrical circuit which supplies the solenoid 70. A conventional bellows-type vacuum controller has been found satisfactory, and a controller of this type is here shown. In Fig. 2, one side 78 of the bellows assembly communicates with the atmosphere and the other side 80 thereof communicates through a tube 82 with the pipe 66 between the pump 40 and valve 68. The high-temperature control 76 here shown has a thermostatic element 84 which extends into an extension 86 of pipe 66. The thermostatic element 84 is sealed to the pipe extension 86, and it communicates with the pipe 66 between the pump 40 and the valve 68. Electrical current flows from a suitable source to the solenoid 70 through the conductor 88, thence to the vacuum controller 74 through a conductor 90, thence to the high-temperature control 76 through a conductor 92 and thence back to the source through a conductor 94.

Another feature of the control unit is a high-temperature vent between the pump 40 and the valve 68. The vent comprises an extension 96 from the pipe 66, which extension has an outlet 98 communicating with the atmosphere and controlled by a check valve 100. The check valve 100 seats inwardly so that atmospheric pressure against the valve maintains outlet 98 closed as long as less-than-atmospheric pressure exists in the pipe 66. However, if pressure in the pipe 66 at any time exceeds atmospheric pressure, valve 100 opens to vent the pipe to atmosphere.

As suggested, the vacuum to be maintained in the return side of the indirect heating system may vary, depending upon the exigencies of the particular situation, but usually less vacuum is required in the return side of this system than in the return side of the direct heating system. From three to seven inches of mercury vacuum in the return side of the indirect heating system is typical. In the instant installation this vacuum is maintained when such vacuum is necessary or beneficial by the joint operation or functioning of the two controls 74 and 76.

The high-temperature control 76 is normally closed. Under the conditions specified above, the vacuum control 74 closes to complete a circuit through the solenoid 70 when the vacuum in the return side of the indirect heating system falls to three inches of mercury. Energization of solenoid 70 opens valve 68 and connects the vacuum heating pump 24 to the return side of the indirect heating system. When this occurs, air and noncondensable gases which accumulate in condensate pump 40 are exhausted and pressure in the entire return side of the indirect heating system is reduced. When the vacuum in the return side of the indirect heating system increases to seven inches of mercury, the vacuum control 74 operates to open the circuit through solenoid 70 to close valve 68 and to shut off communication between the vacuum pump and the indirect heating system. Thus the hot returns from the indirect heating system are maintained separate at all times from the relatively cool returns in the direct heating system so that the vacuum heating pump 24 cannot become overheated. At the same time, the vacuum heating pump 24 is utilized to maintain a requisite reduced pressure in both the direct and the indirect heating systems while maintaining optimum efficiency of operation.

It sometimes happens that a leaky valve somewhere in the indirect heating system permits steam to escape into the return line of the system. When this occurs, steam may accumulate in the condensate pump 40, and if this steam is drawn into the vacuum heating pump 24 it causes the latter to become excessively heated. One function of the high-temperature control 76 is to obviate this contingency. Steam drawn through the pipe 66 by vacuum heating pump 24 comes in contact with the thermostatic element 84 and opens contact elements in the control 76 to interrupt the circuit through solenoid 70. Thus passage of steam through pipe 66 in an amount sufficient to overheat vacuum pump 24 automatically closes valve 68 independently of the vacuum control 74. Further, steam in the condensate pump 40 rises into the extension 86 and maintains the high-temperature control 76 open. Since valve 68 cannot open under these conditions, pressure in the condensate pump 40 gradually increases to atmospheric pressure. When this occurs, steam escapes to the atmosphere through the high-temperature vent 96 where it can be readily observed and where it serves as a warning that leaky traps in the system should be fixed.

A typical operation of a steam heating system embodying the present invention is as follows: Before steam is turned on in the morning, the engineer normally starts the vacuum heating pump 24 to create a partial vacuum in the system. Valve 68 is open at the time the vacuum heating pump 24 is turned on, so that substantially atmospheric pressure exists throughout both the direct and the indirect systems. The vacuum control 74 shuts valve 68 when the vacuum heating pump 24 has drawn about seven inches of mercury vacuum in the return side of the indirect heating system. The vacuum heating pump 24 continues to function until about twenty inches of mercury vacuum exists in the return side of the direct heating system. Conventional vacuum controls (not shown) in the latter system then shut off the vacuum heating pump 24. The exact reduction of pressure, however, in the two systems is not critical. The main purpose is merely to exhaust air from the systems sufficiently so that steam can more readily enter the various heating and other units in the systems and thus substantially shorten the warm-up period. It is significant that the vacuum heating pump 24 functions at this time to remove air automatically from the return side of both the direct and the indirect heating systems.

The usual procedure is merely to run the vacuum heating pump 24 for a few minutes to pull at least some vacuum in the return lines and then open the steam valves to admit steam into the supply lines of the systems. The steam enters the various units in the systems at full pressure since the steam-control valves in the supply lines are open at this time. In a short time, the return lines from the various units in the indirect heating system and particularly from the coils in the central fan unit 32 become hot as the combination float and thermostatic valve with which these units are conventionally equipped dump the condensate as rapidly as it accumulates independently of its temperature. At this time, the temperature of condensate in the return lines of the indirect heating system is only slightly lower than the temperature of the steam being supplied to the system. When the condensate reaches the pump 40, the thermostatic element 84 senses the high return temperature and interrupts the circuit to solenoid 70 which then closes valve 68.

After valve 68 closes, pressure in the receiver of pump 40 increases gradually to atmospheric pressure, since the receiver is closed off from the vacuum heating pump 24. At about the time pressure in the pump receiver reaches atmospheric pressure, the hot-air vent 96 opens to vent gases to the atmosphere. During this portion of the cycle, no vacuum is required in the return lines of the indirect heating system as the full steam pressure in the supply lines assures a sufficient pressure differential to keep the heating coils of the various units full of steam and drained of condensate and air.

However, after the heating-up period, the thermostatic controls in the air ducts of the fan system begin to throttle the steam control valve 48. This causes the return lines to cool sufficiently so that the high-temperature control 76 again closes the circuit through solenoid 70 to open valve 68 and to place the vacuum heating pump 24 in communication with the return side of the indirect heating system. Thereafter the vacuum heating pump 24 functions to maintain a reduced pressure in the return lines of the indirect heating system in the manner hereinabove described.

During this entire cycle, the operation of the direct heating system is not affected in any way. It operates normally as though entirely dissociated from the indirect heating system. This is possible because the hot returns in the indirect heating system have no influence on the operation of the vacuum heating pump 24, and the pump can therefore perform its duties efficiently with respect to the direct heating system independently of the indirect heating system or the conditions existent therein. It will be understood in this connection that the thermostatic control 76 cuts off the line between the vacuum heating pump 24 and condensate pump 40 each time the steam-control valve on the central fan unit 32 or other apparatus in the system opens wide so that the temperature of the returns becomes too high for the capacity of the vacuum producer 24 at even the low vacuum setting provided. Each time this occurs, the return line of the indirect heating system comes up to atmospheric pressure and vents to atmosphere as described. During the atmospheric vent portion of the cycle, the indirect heating system operates just as any gravity system which is not equipped with a vacuum pump.

The significant thing, in so far as the instant invention is concerned, is that the arrangement here shown automatically provides the benefits of vacuum for the indirect heating system exactly when vacuum is most beneficial; i. e., before the steam is first turned on and during the periods when the steam-control valves are throttling. When vacuum is not [provide] *provided* in the indirect heating system, conditions in the system are such that vacuum is not required. Thus the present arrangement represents a substantial improvement over the conventional atmospheric vent system, because it assures a sufficient differential to keep the system drained of condensate air and gases when the steam valves are throttled. It functions to maintain a controlled vacuum on the direct heating system at all times and to place the indirect heating system under vacuum only when vacuum in this system is beneficial.

Attention is now directed to Fig. 3 which shows a modified control unit for the valve 68. This control unit is identical to the unit hereinabove described except that the vacuum controller 74 is connected across the supply and return sides of the indirect heating system so as to maintain a predetermined pressure differential between the two sides of the system. Specifically the side 78 of the bellows unit is connected by a tube 104 to some predetermined location in the supply side of the system, and the side 80 of the bellows unit is connected by the tube 82 to some predetermined location in the return side of the system.

It should be understood in this connection that the tubes [80] *82* and 104 can be connected at any place in their respective sides of the system at which it is desirable to maintain a predetermined pressure differential. The purpose of the controller 74 in this form of the invention is to maintain a lower pressure in the return side of the system than in the supply side of the system so as to assure proper flow of condensate and incondensable gases therethrough at all times. Fig. 3 illustrates a typical arrangement. The tube 104 is there shown connected to the heating coil of central fan unit 32 behind the steam throttling valve 48, and the tube 82 is shown connected to the pipe 66 as in the form of the invention first described.

It will be readily appreciated that the latter form of control unit functions in substantially the same manner to achieve substantially the same results as the form of the invention first described. The only difference is that the vacuum controller 74 operates to maintain a pressure on the return side of the indirect heating system which is lower by a predetermined amount than the pressure at some point in the supply side of the system, whereas the form of the invention first described operates to maintain the return lines of the indirect heating system at a predetermined pressure lower than atmospheric pressure.

Reference is now had to Figs. 4 and 5 which illustrate a modified arrangement adapted primarily for use with steam heating installations of the above type wherein the so-called direct system is maintained under relatively low vacuum. There are many presently installed heating installations having direct and indirect systems wherein the return lines of both systems are maintained under a relatively low vacuum of, for example, three to eight inches of mercury. These installations can be readily adapted or converted for operation according to the present invention. Also, in many instances it is necessary or desirable, when putting in a new steam heating installation, to use a relatively low vacuum of the order specified above in both the direct and indirect systems. Under these circumstances it may well be desirable to install initially the particular arrangement shown in Figs. 4 and 5 rather than the forms first described.

The modification now under consideration has all the advantages of the form first described in that it maintains the vacuum pump in communication with the return line of the direct system so as to maintain a predetermined pressure less than atmospheric therein and connects the vacuum pump with the return line of the indirect system whenever conditions in this system are such that a vacuum is beneficial. It will be appreciated in this connection that, except for the modified arrangement of the parts, the same conditions obtain as in the system first described: viz., the condensate in the return line of the direct system is relatively cool so that possibility of it flashing into steam in or near the vacuum pump is remote, if not impossible, and the condensate in the return line of the indirect system is relatively hot only occasionally. During the times when the condensate in the indirect system is so hot that it would flash into steam when exposed to the vacuum maintained in the direct system, communication between the vacuum pump and the indirect system is shut off. However, as pointed out above, a vacuum in the returns of the indirect system is not needed or particularly beneficial at this time. On the other hand, when the condensate in the indirect system is relatively cool, conditions in the system are such that a vacuum is beneficial or even necessary thereto for maximum efficiency in operation. Under these conditions the apparatus of this invention is operative to connect the vacuum pump to the return side of the indirect system so that the pump maintains the return lines of both the direct and indirect system under vacuum.

Considering first certain of the broader aspects of the invention it will be observed that the vacuum controller 110 of the modified arrangement now being described is not connected directly in the control circuit of the solenoid valve 68 as in the first forms of the invention. Instead, it (the vacuum controller 110) is connected directly in the control circuit of the vacuum pump 24. The valve 68 is connected in the line 66 as previously described, and this valve is controlled solely by the thermostatic control 76. Thus in this form of the invention the valve 68 is open whenever the thermostatic control 76 senses a temperature less than a predetermined maximum temperature and is closed whenever the control 76 senses a temperature greater than the predetermined maximum temperature. Except for these differences the system is identical to the system hereinabove described.

In order to simplify the description, parts of the modification now under consideration which are identical to corresponding parts in the form of the invention first described are identified by the same reference numerals. The identical parts of this system accordingly will not be described in detail. Only those parts which are different will be so described.

Specifically, a conventional bellows-type vacuum controller 110 is here shown mounted on the receiver 112 of the vacuum pump 24. One side of the bellows assembly communicates with the atmosphere at 114 and the other side thereof communicates through a tube 116 with the receiver 112. Also it will be observed that the vacuum controller 110 is electrically connected in the control circuit of the pump 118. Current is supplied to the pump 118 from any suitable source through a conductor 120. Thence the current flows through conductor 122 to the vacuum controller 110, and from the controller the current travels through a conductor 124 back to the source. Thus the vacuum controller 110 is connected in series with the pump 118 so that the vacuum controller turns the pump 118 on and off in accordance with the particular pressure sensed by the controller. The controller 110 of course senses the pressure in the receiver 112 and in a normally operating steam heating system it is conventional to set the vacuum controller so that it starts the pump 118 in operation when the vacuum in the receiver reaches three inches of mercury and to stop the pump 118 when the vacuum in the receiver increases to eight inches of mercury. Thus, the vacuum pump 24 maintains a vacuum in the return line 20 at all times, although the vacuum may vary between three and eight inches of mercury. This vacuum is sufficient in a system of this type to keep the direct system essentially free from condensate and to maintain a proper flow and dispersion of steam in the supply side of the direct system.

As suggested, the only thing which operates the solenoid valve 68 in this form of the invention is the temperature control 76. As shown in Fig. 5, the electrical conductor 88 extends from the source to the solenoid 70 as heretofore, but in this case the conductor 90 extends from the solenoid 70 directly to the temperature control 76. The electrical conductor 94 also extends from the temperature control 76 back to the source in the same manner as in the first form of the invention. As shown, the thermostatic element 84 of the control 76 is contained within the extension 86 of pipe 66.

In a typical installation, the thermostatic control 76 may be set to open the valve 70 whenever the temperature sensed is below a predetermined maximum temperature and to close the valve whenever the temperature sensed by the control exceeds the predetermined maximum. In this typical installation, the maximum temperature may be, for example, 180°. In every instance the temperature for which the control 76 is set should be at least slightly below the temperature at which water will flash into steam under the maximum vacuum maintained by the vacuum pump 24.

It is believed that the operation of the form of the invention here under consideration will be apparent from the foregoing description, but in the interest of clarity a brief summary of this operation is now given. The vacuum controller 110 maintains sufficient vacuum in the return side of the direct system to assure proper operation of this system. The temperature control 76 will close the control circuit through the solenoid 70 and open valve 68 whenever the condensate returns in the indirect system are sufficiently cool so that they will not flash into steam at the relatively low pressure maintained by the vacuum pump 24. When valve 68 is open, the vacuum pump 24 maintains a corresponding low pressure in the return lines of the indirect system. Under these circumstances the situation in the indirect system is such that a vacuum is most beneficial. However, in the event the condensate returns in the indirect system become excessively hot, the temperature control 76 interrupts the circuit through solenoid 70 and closes valve 68. The conditions obtaining in the indirect system under such circumstances are such that a vacuum in the return line of the system is not necessary or particularly beneficial. It is necessary to close communication between the direct and indirect systems through pipe 66 under the circumstances last referred to because otherwise the then hot returns would flash into steam and prevent the vacuum pump 24 from producing the maximum vacuum for which it is set. This would cause the vacuum pump 24 to run continuously as long as the high temperatures obtained in the indirect system. The result would be excessive wear of the vacuum pump 24 and in all probability under these circumstances the pump would not be able to maintain sufficient vacuum in either the direct or indirect system to accomplish its intended purpose. Thus the instant arrangement permits the vacuum pump 24 to maintain a proper vacuum at all times in a direct system and to extend a corresponding vacuum to the indirect system whenever a vacuum in the latter system is most beneficial. If conditions change in the indirect system so that the operation of the vacuum pump 24 would be adversely affected, communication between the direct and indirect systems is shut off. However, under these conditions a vacuum is not needed or particularly beneficial in the indirect system.

It may be seen that we have achieved the objects of our invention. We have provided a steam heating system having separate relatively hot and relatively cool returns, each of which is maintained under a reduced pressure which is best suited for it under all conditions where a reduced pressure is beneficial. The reduced pressures are maintained by a single vacuum pump and in such manner that the relatively hot returns cannot possibly overheat the pump, with resulting partial or total loss in efficiency and increase in power consumption.

Having thus described the invention, we claim:

1. A steam heating system having a relatively low temperature return line for condensate and noncondensable gases, and a relatively high-temperature return line for condensate and noncondensable gases, pump means in the relatively low-temperature return line for pumping condensate through the line and for maintaining the line under a predetermined pressure less than atmospheric, a separate air inlet for said pump means, pump means in the relatively high-temperature return line for pumping condensate through the line, a receiver in said high-temperature return line in which air and noncondensable gases are separated from liquid condensate traversing said line, a separate air outlet in said receiver through which noncondensable gases in the condensate are vented, a pipe interconnecting the outlet with said inlet, a normally closed valve in and controlling flow through the pipe, pressure-sensitive means for opening said valve in response to pressure conditions in said relatively high-temperature return line, said pressure-sensitive means adapted to open said valve when pressure in the relatively high-temperature return line reaches a predetermined maximum pressure less than atmospheric so as to connect said return line to vacuum in said first-mentioned pump means and to close said valve when pressure in the relatively high-temperature return line reaches a predetermined minimum pressure less than atmospheric so as to close communication between the return line and said first-mentioned pump means, temperature-sensitive means for controlling the valve in conjunction with said pressure-sensitive means and for controlling said pressure-sensitive means in response to temperature conditions in a predetermined portion of the relatively high-temperature return line, said temperature-sensitive means being operative to maintain said valve closed whenever temperature in said location exceeds a predetermined temperature, and a high-temperature vent for said high-temperature return line adapted to release gases to the atmosphere whenever pressure in the line becomes approximately equal to atmospheric pressure.

2. A steam heating system having a relatively low temperature return line for condensate and noncondensable gases, and a relatively high-temperature return line for condensate and noncondensable gases, pump means in the relatively low-temperature return line for pumping condensate through the line and for maintaining the line under a predetermined pressure less than atmospheric, a separate air inlet for said pump means, pump means in the relatively high-temperature return line for pumping condensate through the line, a receiver in said high-temperature return line in which air and noncondensable gases are separated from liquid condensate traversing said line, a separate air outlet in said receiver through whtich noncondensable gases in the condensate are vented, a pipe interconnecting said outlet with said inlet, a valve in and controlling flow through the pipe, pressure-sensitive means for operating said valve in response to pressure conditions in said relatively high-temperature return line, said pressure-sensitive means adapted to open said valve when pressure in the relatively high-temperature return line reaches a predetermined maximum pressure less than atmospheric so as to connect said return line to vacuum in said first-mentioned pump means, and to close said valve when pressure in the relatively high-temperature return line reaches a predetermined minimum pressure less than atmospheric so as to close communication between the return line and said first-mentioned pump means, and temperature-sensitive means for controlling the valve in conjunction with said pressure-sensitive means and for controlling said pressure-sensitive means in response to temperature conditions in a predetermined portion of the relatively high-temperature return line, said temperature-sensitive means being operative to maintain said valve closed whenever temperature in said predetermined location exceeds a predetermined temperature.

3. A steam heating system having a relatively low-temperature return line for condensate and noncondensable gases, and a relatively high-temperature return line for condensate and noncondensable gases, pump means in the relatively low-temperature return line for pumping condensate through the line and for maintaining the line under a predetermined pressure less than atmospheric, a separate air inlet for said pump means, separate pump means in the relatively high-temperature return line for pumping condensate through the line, a receiver in said high-temperature return line in which air and noncondensable gases are separated from liquid condensate traversing said line, a separate air outlet in said receiver through which noncondensable gases in the condensate are vented, a pipe interconnecting said outlet with said inlet, a valve in and controlling flow through the pipe, and pressure-sensitive means for operating said valve in response to pressure conditions in said relatively high-temperature return line, said pressure-sensitive means adapted to open said valve when pressure in the relatively high-temperature return line reaches a predetermined maximum pressure less than atmospheric so as to connect said return line to said first-mentioned pump means and to close said valve when pressure in the relatively high-temperature return line reaches a predetermined minimum pressure less than atmospheric so as to close communication between the return line and said first-mentioned pump means.

4. A steam heating system having a relatively low temperature return line for condensate and noncondensable gases, and a separate relatively high-temperature return line for condensate and noncondensable gases, pump means in the relatively low-temperature return line for pumping condensate through the line and for maintaining the line under a predetermined pressure less than atmospheric, a separate air inlet for said pump means, separate pump means in the relatively high-temperature return line for pumping condensate through the line, a receiver in said high-temperature return line in which air and noncondensable gases are separated from liquid condensate traversing said line, a separate air outlet in said receiver through which noncondensable gases in the condensate are vented, a pipe interconnecting said outlet with said inlet, valve means controlling said pipe, and means for operating the valve in response to temperature and pressure conditions in the system.

5. A condensate pump unit adapted for use in the return line of a steam heating system capable of handling hot condensate in the line and having a receiver in which air and noncondensable gases are separated from liquid in the receiver, an outlet for venting noncondensable gases from the receiver, a valve controlling said outlet, pressure-sensitive means for operating the valve in response to pressure conditions in the line, said pressure-sensitive means operative to open the valve when in response to a relatively high pressure less than atmospheric and to close the valve in response to a relatively low pressure less than atmospheric, temperature-sensitive means for controlling the valve and said pressure-sensitive means in response to temperature conditions in the line, said temperature-sensitive means being operative to maintain said valve in a closed position independently of pressure conditions when the temperature sensed thereby exceeds a predetermined maximum temperature, and a high temperature vent for releasing air and gases from the unit whenever pressure in the pump exceeds approximately atmospheric pressure.

6. Apparatus for use in a steam heating system of the type having relatively high and relatively low temperature return lines comprising a pump adaptable to be connected in said relatively high temperature return line for pumping condensate only and having a receiver provided with an air outlet, a valve controlling said outlet, pressure-sensitive means adapted to be connected in the system so as to be responsive to pressure conditions in the relatively high temperature return line for opening said valve at a predetermined, relatively high pressure less than atmospheric and for closing the valve at a predetermined relatively low pressure less than atmospheric, and a separate temperature-sensitive means adapted to be connected in the system so as to be responsive to temperature conditions in said relatively high temperature return line operative to hold said valve closed regardless of said pressure-sensitive means when the temperature sensed thereby exceeds a predetermined maximum temperature.

7. Apparatus for use in a steam heating system comprising a vacuum pump unit having an air inlet, a valve controlling said inlet, pressure-sensitive means for operating said valve and responsive to pressure conditions ahead of the valve, said pressure-sensitive means operative to open the valve when a predetermined, relatively high pressure less than atmospheric exists ahead of the valve and to close the valve when a predetermined, relatively low pressure less than atmospheric exists ahead of the valve, and a temperature-sensitive means for controlling the valve independently of said pressure-sensitive means and responsive to temperature conditions ahead of the valve, said temperature-sensitive means operative to hold the valve closed at all times regardless of the pressure-sensitive means when a predetermined, relatively high temperature exists ahead of the valve.

8. A steam heating system having a relatively high-temperature return line for condensate and noncondensable gases, pump means in said return line for pumping condensate therethrough, a receiver in said return line in which air and noncondensable gases are separated from liquid condensate traversing said line, an air outlet in said receiver above the normal level of liquid therein through which noncondensable gases in the condensate are vented, a vacuum source, a pipe interconnecting said outlet with said vacuum source through which air and noncondensable gases are drawn from the receiver and parts of the system communicating therewith, a normally closed valve an and controlling flow through said pipe, pressure-sensitive means connected to the valve and responsive to pressure conditions in the line, said pressure-sensitive means adapted to open said valve when pressure in the return line reaches a predetermined maximum pressure less than atmospheric so as to connect said return line to said vacuum source and to close said valve when pressure in the return line reaches a predetermined minimum pressure less than atmospheric so as to close communication between the return line and said vacuum source, temperature-sensitive means connected to said valve for controlling the same in conjunction with said pressure-sensitive means, said temperature-sensitive means being responsive to temperature conditions in said return line and operative to maintain said valve closed whenever the temperature in said line exceeds a predetermined temperature, and a high-temperature vent in said return line adapted to release gases to the atmosphere whenever pressure in the line becomes approximately equal to atmospheric pressure.

9. A direct heating system having a condensate return line, an indirect heating system having a steam-supply line equipped with a steam-control valve and a condensate return line, pump means in the return line of said direct system for pumping condensate through the line and for maintaining the line under a predetermined pressure less than atmospheric, an air inlet for said pump means, pump means in the return line of said indirect heating system for pumping condensate through the line, a receiver in the return line of said indirect heating system adapted to receive condensate traversing the line and in which air and noncondensable gases are separated from liquid condensate, a pipe interconnecting said air inlet with the receiver above the normal level of liquid therein, a normally closed valve in and controlling flow through the pipe, a differential pressure controller sensitive to pressure conditions in the steam-supply line behind said steam-control valve and in the condensate-return line of said indirect system operatively connected to the valve to open the same when the pressure differential between the two sides of the system reaches a predetermined minimum and to close the same when said pressure differential reaches a predetermined maximum, temperature-sensitive means connected to said valve for controlling the same in conjunction with said differential pressure controller, said temperature-sensitive means being responsive to temperature conditions in the condensate-return line of said indirect system and operative to maintain said valve closed whenever the temperature in said line exceeds a predetermined maximum temperature, and a high-temperature vent in the return line of said indirect system adapted to release gases to the atmosphere whenever pressure in the line becomes approximately equal to atmospheric pressure.

10. A steam heating system having a steam-supply line and a relatively high-temperature return line for condensate and noncondensable gases, pump means in said return line for pumping condensate therethrough, a receiver in said return line in which air and noncondensable gases are separated from liquid condensate in the receiver, a vacuum source, a pipe interconnecting said vacuum source with the receiver above the normal level of liquid therein through which air and noncondensable gases are drawn from the receiver and parts of the system in communication with the receiver, a normally closed valve in and controlling flow through said pipe, a differential pressure controller connected across in the steam-supply and condensate-return lines of the system and sensitive to pressure conditions therein, said controller being operatively connected to said valve to open the same when the pressure differential between the supply and return sides of the system drops to a predetermined minimum and to close the same when said pressure differential reaches a predetermined maximum temperature-sensitive means connected to said valve for controlling the same in conjunction with said differential pressure controller, said temperature-sensitive means being responsive to temperature conditions in said return side of the system and operative to maintain said valve closed whenever the temperature in said line exceeds a predetermined temperature, and a high-temperature vent in the return side of the system adapted to release gases to the atmosphere whenever pressure in the return line becames approximately equal to atmospheric pressure.

11. Apparatus for use in a steam heating system comprising a vacuum producer having an air inlet, means forming a conduit extending from and communicating with said inlet, a valve controlling said conduit, pressure-sensitive means operatively connected to said valve and adapted to sense pressure conditions in the system ahead of the valve, said pressure-sensitive means being operative to open the valve when it senses a predetermined relatively high pressure less than atmospheric and to close the valve when it senses a predetermined relatively low pressure less than atmospheric, a temperature-sensitive means connected to the valve for controlling the same in conjunction with said pressure-sensitive means, said temperature-sensitive means being adapted to sense temperature conditions in the system ahead of the valve and operative to maintain said valve closed whenever the temperature sensed thereby exceeds a predetermined maximum temperature, and a high-temperature vent in said conduit means on the side of the valve remote from the inlet adapted to release gases to the atmosphere whenever pressure at the vent becomes approximately equal to atmospheric pressure.

12. For use in space-heating apparatus for buildings and the like of the type having a direct heating system including a condensate-return line equipped with a vacuum pump for operating the system at less-than-atmospheric pressure and an indirect heating system having a condensate return line equipped with a condensate pump and a receiver in which air and noncondensable gases are separated from the liquid condensate, a control unit for utilizing said vacuum pump to reduce the pressure in the return line of said indirect heating system intermittently and when conditions in the system are such that a reduction in pressure therein is beneficial, said control unit comprising a conduit adapted to be connected between the inlet of the vacuum pump and the receiver above the normal level of liquid therein, a valve controlling said pipe, a vacuum controller operatively connected to the valve and responsive to conditions in the indirect heating system to open the valve when a predetermined, relatively [low] *high* pressure less than atmospheric exists in the system and to close the valve when a predetermined, relatively [high] *low* pressure less than atmospheric exists in the system, and a temperature controller operatively connected to the valve and to said vacuum controller and responsive to temperature conditions in the indirect heating system to close said valve irrespective of said pressure controller when temperature conditions in the system exceed a predetermined maximum.

13. For use in space-heating apparatus for buildings and the like of the type having a direct heating system including a condensate-return line equipped with a vacuum pump for operating the system at less than atmospheric pressure and an indirect heating system having a condensate return line equipped with a condensate pump and a receiver in which air and noncondensable gases are separated from the liquid condensate, a control unit for utilizing said vacuum pump to reduce the pressure in the return line of said indirect heating system intermittently and when conditions in the system are such that a reduction in pressure therein is beneficial, said control unit comprising a conduit adapted to be connected between the inlet of the vacuum pump and the receiver above the normal level of liquid therein, a valve controlling said pipe, a vacuum controller operatively connected to the valve and responsive to conditions in the indirect heating system to open the valve when a predetermined, relatively [low] *high* pressure less than atmospheric exists in the system and to close the valve when a predetermined, relatively [high] *low* pressure less than atmospheric exists in the system, a temperature controller operatively connected to the valve and to said vacuum controller and responsive to temperature conditions in the indirect heating system to close said valve irrespective of said pressure controller when temperature conditions in the system exceed a predetermined maximum, and a high-temperature vent in the conduit between said valve and the end of the conduit adapted for connection to said receiver, said vent adapted to release gases to the atmosphere whenever pressure at the vent becomes approximately equal to atmospheric pressure.

14. A steam heating system having a relatively low temperature return line for condensate and noncondensable gases, and a relatively high temperature return line for condensate and noncondensable gases, a vacuum pump in the relatively low temperature return line for pumping condensate through the line and for maintaining the line under predetermined pressure less than atmospheric, a separate air inlet for said vacuum pump, a condensate pump in the relatively high-temperature return line for pumping condensate through the line, a receiver in said high temperature return line in which air and noncondensable gases are separated from liquid condensate traversing said line, a separate air outlet in said receiver through which noncondensable gases in the condensate are vented, a pipe interconnecting said outlet and said inlet, a valve in and controlling flow through the pipe, pressure-sensitive means operatively connected to said vacuum pump for regulating the degree of vacuum produced thereby, and temperature-sensitive means operatively connected to said valve and having a temperature-sensitive element exposed to conditions in said relatively high temperature return line, said temperature-sensitive means being operative to close said valve whenever the temperature around said temperature-sensitive element exceeds a predetermined temperature and to open said valve whenever the temperature around said element is below said predetermined temperature.

15. A steam heating installation having a relatively low temperature return line and a relatively high temperature return line, a pump in the high temperature return line for handling condensate only including a receiver having an air vent, conduit means interconnectig said air vent and said low temperature return line, a valve controlling said conduit means, means for maintaining a predetermined pressure less than atmospheric in said low temperature return line, and means responsive to temperature conditions in said high temperature return line operatively connected to said valve to open the valve when the temperature to which said means is responsive is below a predetermined temperature and to close said valve when the temperature to which said means is responsive exceeds said predetermined temperature.

16. In combination with a steam heating installation having a condensate return line, a condensate pump in said line having a receiver provided with an air vent, a vacuum source, conduit means interconnecting said vacuum source and said air vent permitting vacuum from said source to be extended into said return line, valve means controlling said conduit means, and a control device operatively connected to said valve and responsive to temperature conditions in said return line, said control device being operative to open the valve when the temperature to which the device is responsive is below a predetermined temperature and to close said valve when the temperature to which the device is responsive exceeds said predetermined temperature.

17. A steam heating system having a steam supply line and a condensate return line, a receiver in said return line in which air and nonconsensable gases are separated from liquid condensate, said receiver having an air vent, a vacuum source, a pipe connecting said vacuum source to said air vent providing communication between said vacuum source and said condensate return line and permitting said vacuum source to establish a partial vacuum in said condensate return line, a consendate removal pump separate and distinct from said vacuum source connected to said receiver and operative to prevent condensate from entering said pipe and gaining access to said vacuum source, a valve in said pipe for controlling communication between said vacuum source and said condensate return line, and a pressure differential controller for selectively opening said valve to connect the vacuum source to said return line, said controller being connected to the supply and return sides of the system and operative when the pressure in the supply side exceeds the pressure in the return line by a predetermined maximum to close said valve and operative when the pressure in the supply line exceeds the pressure in the return line by a predetermined minimum to open said valve.

18. Apparatus for use in a steam heating installation comprising a receiver in said return line in which air and noncondensable gases are separated from liquid condensate, said receiver having an outlet for venting noncondensable gases from the receiver, a vacuum pump having an air inlet, means providing a conduit interconnecting the inlet of said vacuum pump and the outlet of said receiver permitting said vacuum pump to establish a partial vacuum in said condensate return line, a condensate removal pump separate and distinct from said vacuum pump connected to said receiver and operative to prevent condensate from entering said conduit and gaining access to said vacuum pump, a valve controlling said conduit, and a temperature control operatively connected to said valve responsive to temperature conditions at one side of the valve to open said valve when the temperature to which said control is responsive is below a predetermined temperature and to close said valve when the temperature to which said valve is responsive exceeds said predetermined temperature.

References Cited in the file of this patent or the original patent

UNITED STATES PATENTS

| | | |
|---|---|---|
| 1,382,645 | Hutchinson | June 28, 1921 |
| 1,708,622 | Hoffman | Apr. 9, 1929 |
| 1,727,965 | Crosthwaith | Sept. 10, 1929 |
| 1,875,898 | Thompson | Sept. 6, 1932 |
| 1,956,004 | Carson | Apr. 24, 1934 |
| 1,981,365 | Macdonald | Nov. 20, 1934 |
| 2,160,004 | Stamm | May 30, 1939 |
| 2,193,160 | Browne | Mar. 12, 1940 |
| 2,312,191 | Reader | Feb. 23, 1943 |
| 2,338,495 | Davies | Jan. 4, 1944 |